United States Patent [19]

Gage

[11] Patent Number: 5,349,576

[45] Date of Patent: Sep. 20, 1994

[54] APPARATUS AND METHOD FOR POLARIZATION SWITCHING OF A READOUT BEAM IN A MAGNETO-OPTIC STORAGE SYSTEM

[75] Inventor: Edward C. Gage, Rochester, N.Y.

[73] Assignee: Eastman Kodak Company, Rochester, N.Y.

[21] Appl. No.: 919,668

[22] Filed: Jul. 27, 1992

[51] Int. Cl.⁵ .............................................. G11B 13/04
[52] U.S. Cl. ........................................ 369/13; 369/110
[58] Field of Search ........................... 369/13, 110, 114

[56] References Cited

U.S. PATENT DOCUMENTS

| | | | |
|---|---|---|---|
| 4,410,277 | 10/1983 | Yamamoto et al. | 356/366 |
| 4,571,650 | 2/1986 | Ojima et al. | 360/114 |
| 4,955,006 | 9/1990 | Fukushima et al. | 369/13 |
| 4,959,821 | 9/1990 | Morimoto et al. | 369/13 |
| 5,105,399 | 4/1992 | Shimonou | 369/13 |
| 5,148,422 | 9/1992 | Sako et al. | 369/13 |
| 5,182,735 | 1/1993 | Kurtz et al. | 369/13 |
| 5,235,570 | 8/1993 | Kurtz et al. | 369/13 |

FOREIGN PATENT DOCUMENTS

| | | | |
|---|---|---|---|
| 182947 | 7/1989 | Japan | 369/13 |

*Primary Examiner*—Richard A. Bertsch
*Assistant Examiner*—Roland G. McAndrews, Jr.
*Attorney, Agent, or Firm*—Raymond L. Owens

[57] ABSTRACT

Apparatus and method for determining an orientation of magnetic domains currently being irradiated by a laser having two orthogonal linearly polarized modes of operation is described. The orientation of the currently irradiated magnetic domains determines which linear polarization mode is currently active and can be used as a readout technique for signals encoded in a magneto-optic medium. This polarization switching technique for the reading stored information is dependent on adjusting the parameters of the extended laser cavity so that excitation of each polarization mode is substantially equally probable. When the parameters of the extended laser cavity are substantially equally probable, then the difference in the attenuation of circularly polarized radiation resulting from interaction with oppositely oriented magnetic domains in a magneto-optic material determine the current polarization mode. To equalize probability for laser excitation in either orthogonal mode, the extended cavity is structured to include regions wherein only one linear polarization mode is present. In the single mode region, the attenuation of associated linearly polarized laser radiation mode can be separately controlled and the presence of laser activity in the associated mode can be easily determined.

16 Claims, 2 Drawing Sheets

APPARATUS AND METHOD FOR POLARIZATION SWITCHING OF A READOUT BEAM IN A MAGNETO-OPTIC STORAGE SYSTEM

BACKGROUND OF THE INVENTION

1. Field of Invention

This invention relates generally to magneto-optic information storage systems and, more particularly, to improvements in the apparatus for interacting with the magneto-optic information storage system to determine the magnetic orientation or state of a selected region of the magneto-optic information storage system.

2. Description of the Related Art

The technique for retrieving information stored in the form of oriented magnetic regions from a magneto-optic storage medium using the Kerr (or the Faraday) effect is known in the related art and can be summarized as follows. The magneto-optic storage medium, having information previously recorded thereon, is scan irradiated with linearly polarized radiation beam (typically from a laser diode). Interaction with the storage medium results in a small clockwise or counterclockwise rotation, typically of the order of 1° or less in the plane of polarization of the reflected or transmitted radiation. The direction of the rotation is determined by the vertical orientation (either up or down) of the irradiated magnetic domains which are indicative of the recorded information. If the impinging linearly polarized radiation is considered to be a combination of two in-phase components, a left-handed circularly polarized (LCP) component and a right-handed circularly polarized (RCP) component, then the resulting Kerr rotation of the linearly polarized radiation beam can be understood as being the result of a media-induced difference in phase retardation between the LCP and the RCP components.

As indicated above, the amount of Kerr rotation produced by a magneto-optic storage medium is relatively small and various schemes have been proposed to enhance the detectability of the direction of rotation. In U.S. patent application Ser. No. 07/319,031 filed on Mar. 6, 1989, entitled MAGNETO-OPTIC READ-OUT METHOD AND APPARATUS USING POLARIZATION SWITCHING OF READOUT BEAM, invented by C. N. Kurtz and J. J. Miceli, Jr, and assigned to the assignee of the present application, a linearly polarized beam of radiation, such as is emitted by a laser diode, is converted to circularly polarized radiation, either RCP or LCP, prior to application to a magneto-optic storage media. Upon being reflected from the medium, the radiation beam is reconverted to a linearly polarized radiation beam parallel to the original linear polarization of the beam. Depending on the orientation of the domains of the medium being irradiated, the circularly polarized radiation will be reflected (or absorbed) as a function of the orientation of the film due to the phenomenon known as magnetic-circular dichroism. When the first mode of the laser and a second (orthogonal) mode of the laser (i.e., the TE and TM modes for a laser diode) are converted to circularly polarized radiation beams, then, when the medium is considered as part of the cavity in which the modes of the laser operate, the orientation of the domains of the storage magneto-optic media will result in a differential decrease in the amplitude of radiation for each mode depending on the laser mode. If the parameters of the laser cavity are adjusted so that the cavity is equally likely to operate in either orthogonal radiation mode, then the orientation of the domains irradiated by the two modes will control which mode is selected for operation.

The apparatus for providing a mode switching type of magnetic orientation for a magneto-optic material has been described by Kurtz and Miceli (cited above) and is shown in FIG. 1. A radiation beam B from emitted from the front face (FF) of a laser L having two (linear and orthogonal) modes of operation is collimated by lens CL and passed through a loss control element LC. Above and below the apparatus shown in FIG. 1 are the states of polarization of the radiation beam during passage through the elements of the read apparatus. The loss control element LC functions to selectively increase the radiation losses in the normally dominant mode of laser operation, i.e., the TE mode for a laser diode, in the extended laser cavity. The losses for the dominant mode of laser operation are adjusted in such an manner that either mode of operation is equally likely. The radiation from the loss control element LC is passed through a polarization converter PC wherein the linearly polarized radiation components are converted into circularly polarized radiation components. In FIG. 1, left-handed circular polarization, LPC, is shown as the result of interaction with the polarization converter. The circularly polarized radiation is focussed on the recording layer RL of the magneto-optic storage medium M by focussing lens FL. The radiation beam is reflected from the recording layer RL and becomes right circularly polarized, RCP. The reflected radiation beam is recollimated by the lens FL and applied to the polarization converter PC. The polarization converter PC restores the linear polarization of the radiation beam to be parallel with the original radiation beam polarization. The restored linear polarized radiation is focussed on the laser L. The extended cavity of the laser can include a reflector R, a loss control element LC, and a rear collimating lens RCL for a radiation beam extending from the rear surface RF of the laser L. It is important that the linear polarization be restored in order that the losses arising from the recording layer are coupled to the mode of laser operation and not be dependent upon the other loss components of the laser cavity. In this manner, the mode of operation of the laser can be determined by the orientation of the irradiated domains, or, stated in another manner, the mode of operation of the laser can be used to determine the orientation of the magnetic domains currently being irradiated by the radiation beam.

One technique for adjusting the losses in the laser cavity wherein the orthogonal modes of operation are in a state of indifferent equilibrium in an absence of the oriented magneto-optic storage material is to replace the magneto-optic film (RL) with a reflector having a reflectance approximately equal to the average reflectance of the recording layer. Then the loss control element (LC) can be adjusted until the orthogonal modes of operation of the laser, including the extended cavity, are in a state of indifferent equilibrium. The loss control element must typically attenuate the two orthogonal modes of operation to provide for the equal possibility of laser operation in either mode, but not attenuate either component to the extent that the amplification of the laser element can not over come the attenuation. The loss control element can be a rotatable polarizer RP placed between the rear laser surface RF and reflector R as shown by dotted lines in FIG. 1. The angle of the polarizer will determine the losses added to the orthogonal radiation modes of the cavity. The loss control element LC can be a (coated) glass plate which is tilted to provide a differential reflection (loss) for the two orthogonal radiation modes. Optical filters can be used to adjust the two losses of the two orthogonal modes of the laser or a compensating coating applied to the front surface of the laser can be used to equalize the probability of laser operation in each of two orthogonal modes.

However, the adjustment of the two modes of laser operation to provide for the equalization of the probability of laser operation is complicated by the fact that the loss control element is in the path of each mode of laser operation. This position of the loss control element results in difficulty in the equalization of the two modes of laser operation and can introduce undesired losses in the mode for which attenuation is not required, A need has been felt for apparatus and an associated method by which the attenuation of the extended cavity of a laser diode can be controlled to implement polarization mode switching in magneto-optic readout apparatus.

SUMMARY OF THE INVENTION

It is an object of the present invention to provide an improved readout apparatus for a magneto-optic storage system.

It is a feature of the present invention to provide a improved polarization mode switching readout apparatus for a magneto-optic storage system.

It is another feature of the present invention to provide a polarization mode switching apparatus in which the extended cavity losses for each polarization mode can be independently adjusted.

It is still another feature of the present invention to implement the extended laser cavity in a polarization mode switching readout apparatus to provide partially separate extended cavities for each polarization mode.

The present invention is directed to overcoming one or more of the problems set forth above. Briefly summarized, according to one aspect of the present invention, in a polarization mode switching readout apparatus in a magneto-optic storage system, the differential attenuation of radiation between two orientations of magnetic domains determines a polarization mode for a laser irradiating the magnetic region. In order that the laser operate generally in a switching mode of operation, each mode of the polarized radiation must be equally probable. In order that excitation of each laser mode be equally probable, an extended cavity for each polarization mode is provided with a region in which only one of the orthogonal radiation mode is present. This separation of extended cavities can be accomplished by providing a partial beam splitter or polarization beam splitter behind a rear face of the laser, the partial beam splitter separating each radiation beam mode. Each radiation beam is reflected from a mirror in front of a detector, the reflected beam being applied to the rear of the laser. A loss device can be positioned in the path of each separated radiation mode for independent adjustment of the threshold for laser operation. These independent adjustments can provide a pair of orthogonally polarized laser beams for which excitation is equally probable. The selection of the polarization mode of the laser beam is then determined by the magnetic orientation of the domains being irradiated by the laser.

These and other aspects, objects, features and advantages of the present invention will be more clearly understood and appreciated from a review of the following detailed description of the preferred embodiments and appended claims, and be reference to the accompanying drawings.

DESCRIPTION OF THE PREFERRED EMBODIMENT(S)

Detailed Description of the Figures

Figure 1:
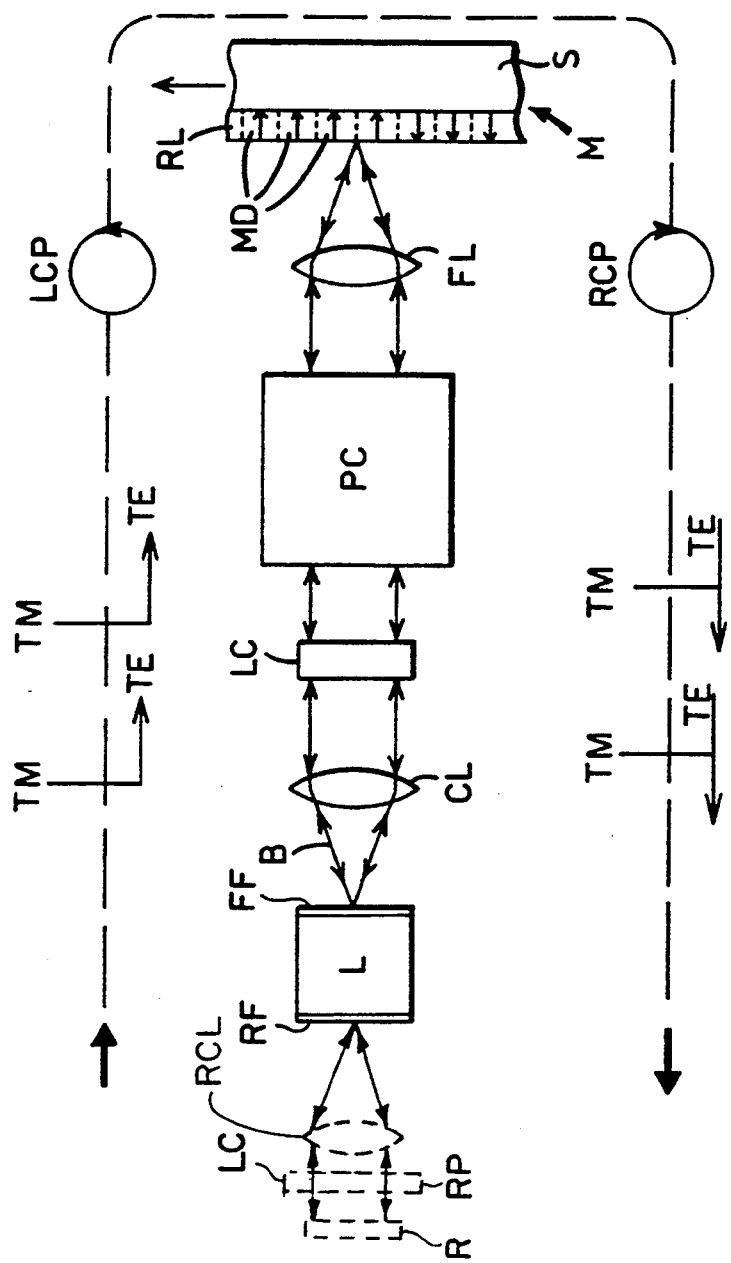
FIG. 1 shows a mode switching apparatus for determination of the orientation of the magnetic domains of an region of a magneto-optic material according to the prior art.

FIG. 1 has been discussed with respect the related art.

Figure 2:
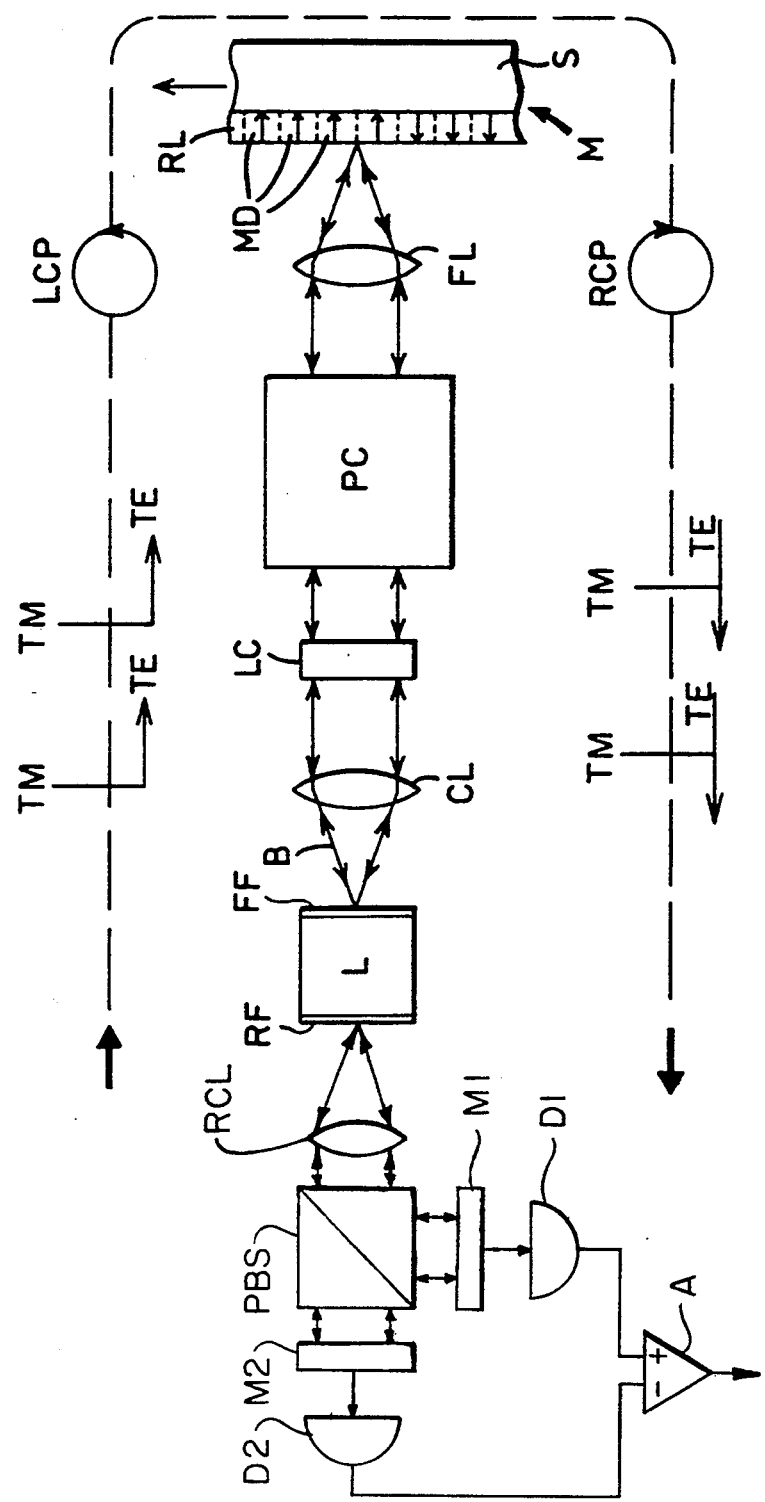
FIG. 2 shows a mode switching apparatus for the determination of the orientation of the magnetic domains of an region of a magneto-optic material according to the present invention.

Referring next to FIG. 2, the polarization switching readout apparatus for a magneto-optic storage system of the present invention is shown. As with the readout apparatus of FIG. 1, polarized orthogonal radiation modes from a laser (diode) are collimated by collimating lens CL, applied to polarization converter wherein the radiation becomes circularly polarized, and after focussing by the focus lens FL, reflected from the read layer RL of the storage medium M. The loss resulting from the reflection from the read layer RL of the magnetic medium is a function, at least in part, of orientation of the magnetic domains. The reflected radiation, now circularly polarized with the opposite orientation, is recollimated by lens FL, and applied to the polarization converter PC. The polarization converter PC converts the circularly polarized radiation into a radiation beam having two orthogonal linearly polarized components restored. The restored radiation beam is focused on the laser L through the front face. Radiation from the rear face of the laser L is collimated by rear collimating lens RCL and applied to partial mean splitter PBS. A first polarization component of the radiation beam is passed through the partial beam splitter PBS, reflected by mirror M2 and, after passing through the partial beam splitter PBS, refocussed on the rear face of laser L. A portion of the radiation beam impinging upon mirror M2 is detected by detector D2. A second polarization component of the radiation beam exiting from the rear face of the laser L is collimated by rear collimating lens RCL, reflected by partial beam splitter PBS, and applied to mirror M1. The radiation beam component applied to the mirror M1 is reflected, is applied to and reflected by the partial beam splitter PBS, and is focussed on the rear face of laser L. A portion of the radiation applied to mirror M1 passes therethrough and is applied to detector D1. Output signals from detector D1 and detector D2 are applied to input terminals of amplifier A. The output signal from amplifier A identifies the polarization mode in which the laser is currently operating.

Operation of the Preferred Embodiments

Referring once again to FIG. 2, the laser is provided with an extended cavity which includes the recording layer RL, the polarization converter, the beam splitter, and the mirrors M1 and M2. The magneto-optic recording layer is included in the extended cavity for both linearly polarized radiation modes. The interaction of the radiation beam with magneto-optic read layer will determine which linearly polarized radiation mode is excited. For this readout apparatus to function satisfactorily, the probability for excitation in either possible linearly polarized radiation mode must be substantially equal in the absence of interaction with oriented magnetic domains. In lasers in general and in semiconductor diode lasers in particular, the probability for laser excitation in either of two orthogonal linearly polarized modes is substantially different, the difference being greater than the relatively modest difference resulting from interaction with the oriented magnetic domains in a magneto-optic medium can overcome. To provide a convenient technique for the equalization of laser excitation in either of two modes, each polarization mode has an extended cavity portion separate from an extended cavity portion associated with the orthogonal polarization mode. In these polarized radiation single mode regions, the attenuation can be varied, in the preferred embodiment by varying the reflectivity of mirrors M1 and M2. Because the attenuation can be varied for each polarization mode separately, the effects of inter mode coupling are substantially eliminated. In addition, the detection of the currently active polarization mode is similarly simplified by placing the detectors in the single mode regions of the extended cavity. The detectors need only distinguish between the presence of substantially no radiation and the presence of a laser excitation mode.

It will be now appreciated that there has been presented apparatus and an associated method for the readout of information stored in the form of oriented domains in a magneto-optic material using a polarization mode switching technique. The present invention, involving a polarization switching mode for the readout operation, provides that each orthogonal polarization mode have a portion of the extended cavity in which only an associated mode is present. Not only can the present invention insure that of the laser modes is equally probable, but detection of the currently active polarization mode is simplified, the presence of radiation in an extended cavity portion identifying the currently operating polarization mode.

Operation of the present invention is believed to be apparent from the foregoing description and drawings, but a few words will be added for emphasis.

Because of the small change in rotation of circularly polarized radiation resulting from the difference in orientation of the magnetic domains, the polarization mode switching detection mechanism is used to reduce uncertainties in the detection of small differences in the radiation beam after interaction with the magneto-optic material. In order for the mode switching detection mode to operate in a practical manner, the extended cavity of the laser radiation must be arranged so that excitation of either orthogonal laser mode is equally probable. In general, this equality of excitation can be achieved through a differential attenuation of the two modes. However, as long as the two modes have the same extended cavity, the attenuation of the modes can be coupled, complicating the equalization process and typically adding undesired attenuation to one of the polarization modes. By separating the two modes in at least a portion of the extended cavity, the attenuation of either mode is independent of the attenuation of the other mode. In addition, the portions of the extended cavity in which only one mode is present provide for a more convenient detection of the currently operating laser mode.

While the invention has been described with reference to reflection from a magneto-optic storage material, it is apparent that the invention is easily adapted to other devices for the readout of information stored in a magneto-optic storage material in which the extended cavity includes transmission of the laser radiation through the magneto-optic storage material. In addition, the invention has generally been described with particular reference to a laser diode, a device which operates in two orthogonal polarization modes, i.e., the TM mode and the TE mode. It will be clear that other laser devices which can be excited into one of two generally orthogonal modes, can be advantageously used in the present invention.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A playback apparatus for playing back information recorded on a recording layer of a magneto-optic material, wherein vertically magnetized domains of said recording layer have a differential absorption to circularly polarized radiation depending on the orientation of said magnetized domains, said playback apparatus comprising:

a laser unit having a first mode and a second mode of linearly polarized radiation, said modes of radiation having planes of polarization that are substantially orthogonal;

optical elements forming an extended cavity for said laser units, said optical elements including:

first conversion means for converting said linearly polarized radiation modes to circularly polarized radiation and for applying said circularly polarized radiation to said recording layer;

second conversion means for converting said circularly polarized radiation to a first and second linearly polarized radiation components having planes of polarization parallel to planes of polarization of said first and said second modes;

separation means for creating a first portion of said extended cavity with only first mode and first component radiation and for creating a second portion of said extended cavity having only second mode and second component radiation therein; and at least one loss control element in a one of said first and said second portions.

2. The playback apparatus of claim of claim 1 wherein said loss control is adjusted to equalize a probability of excitation for said first and said second radiation modes in an absence of differential absorption by said recording layer.

3. The playback apparatus of claim 2 wherein said separation means includes a partial beam splitter for transmitting one radiation mode and associated component and for reflecting the other radiation mode and associated component into associated first and second portions.

4. A playback apparatus for playing back information recorded in a magnetic recording layer of a magneto-optic recording device, wherein said recording layer exhibits a differential absorption for vertically magnetized magnetic domains of opposite orientation, said playback apparatus comprising:

a laser unit having first and second excitation radiation modes which are linearly polarized and which have planes of polarization which are substantially orthogonal;

first conversion and focusing means for converting said modes of linear polarization into circularly polarized radiation and focusing said circularly polarized radiation onto said recording layer:

second conversion and focusing means for converting modulated circularly polarized radiation which has interacted with said recording layer into first and second linearly polarized components parallel with said first and second modes and focusing said modulated linearly polarized components into said laser unit;

a first radiation path means including a first mirror means and a first adjustable loss element for applying said first linearly polarized mode and said first linearly polarized component from said laser unit to said first mirror means and applying radiation reflected from said first mirror to said laser; and a second radiation path means including a second mirror means and a second adjustable loss element for applying said second linearly polarized mode and said second linearly polarized component to said second mirror means and applying radiation reflected from said second mirror to said laser unit.

5. The playback apparatus of claim 4 wherein said modulated circularly polarized radiation is reflected from said recording layer and wherein said first and said second conversion and focusing means use the same optical elements.

6. The playback apparatus of claim 5 wherein radiation applied to said recording layer is received from and thereafter applied to a first face of said laser unit and wherein radiation applied to said first and said second mirror is received from and thereafter applied to a second face of said laser unit.

7. The playback apparatus of claim 6 wherein said first and said second adjustable loss elements are adjusted to provide a substantially equal probability of excitation for said first and said second modes.

8. The playback apparatus of claim 7 wherein said first and said second radiation path include a partial beam splitter for separating linearly polarized radiation components.

9. A playback apparatus for playing back information recorded on a recording layer of a magneto-optic material, wherein vertically magnetized domains of said recording layer have a differential absorption to circularly polarized radiation depending on the orientation of said magnetized domains, said playback apparatus comprising a laser having two linearly polarized modes of radiation excitation, said two linearly polarized radiation modes having planes of polarization generally orthogonal, said playback apparatus comprising an extended cavity for said laser, said extended cavity including said recording layer wherein interaction of laser radiation with magnetized domain of said recording layer determines which radiation mode is currently excited, wherein the playback apparatus is characterized by:

a first portion of said extended cavity in which only a first mode of radiation is present;

a second portion of said extended cavity in which only a second radiation mode is present; and at least one controllable loss element controlling a radiation loss in said first portion.

10. The playback apparatus of claim 9 wherein said controllable loss element is adjusted to provide a substantially equal probability of excitation of said first and said second radiation modes in an absence of differential absorption by said recording layer.

11. The playback apparatus of claim 10 wherein said recording layer forms one extremity of said extended cavity, said first and said second radiation modes being reflected therefrom.

12. The playback apparatus of claim 11 further including a partial beam splitter and a first and a second mirror, wherein boundaries of said first portion of said extended cavity are formed by said partial beam splitter and said first mirror, and wherein boundaries of said second portion are formed by said partial beam splitter and said second mirror.

13. The playback apparatus of claim 12 wherein said first and said second radiation modes are reflected from said recording layer.

14. A method for equalizing excitation of a first and a second mode of generally orthogonal radiation modes from a laser, said laser having an extended cavity wherein said two radiation modes are coupled to vertically magnetized domains of a magneto-optic storage layer, an orientation of said magnetized domains providing a differential absorption to circularly polarized applied to said recording layer, wherein an orientation of said magnetized domains determines which radiation mode is currently excited in said laser, said method comprising the steps of:

a.) converting said linearly polarized radiation from said laser to circularly polarized radiation and applying said circularly polarized radiation to said recording layer;

b.) converting said circularly polarized radiation which has interacted with said recording layer to two linearly polarized components parallel to polarizations of said radiation modes and applying said radiation components to said laser;

c.) separating a first radiation mode and parallel radiation component and applying said separated first radiation to a first portion of said extended cavity, wherein a separated second radiation mode and parallel radiation is applied to a second extended cavity portion; and d.) controlling a radiation loss in said first portion whereby excitation of said first and said second radiation modes become substantially equally probable in an absence of differential absorption by said recording layer.

15. The method of claim 14 further comprising a step of:

reflecting said first and second radiation modes from said recording layer, wherein step a.) and step b.) are performed using the same apparatus.

16. The method of claim 15 wherein said separating step includes the steps of:

transmitting one polarized radiation mode by a partial beam splitter; and reflecting the other polarized radiation mode by said partial beam splitter.

* * * * *